(12) United States Patent
Diebel et al.

(10) Patent No.: US 12,018,746 B2
(45) Date of Patent: Jun. 25, 2024

(54) ELECTRIC COMMERCIAL VEHICLE DRIVE UNIT

(71) Applicant: Harbinger Motors Inc., Gardena, CA (US)

(72) Inventors: Jackson George Diebel, Hermosa Beach, CA (US); Garrett Allen, Los Angeles, CA (US); Alexi Charbonneau, Redondo Beach, CA (US); Alex Tylee, Huntington Beach, CA (US); Samuel Jantzi, Redondo Beach, CA (US); Cody Rhebergen, Lomita, CA (US); Phillip John Weicker, Redondo Beach, CA (US); James Dameron, Gardena, CA (US)

(73) Assignee: Harbinger Motors Inc., Garden Grove, CA (US)

( * ) Notice: Subject to any disclaimer, the term of this patent is extended or adjusted under 35 U.S.C. 154(b) by 0 days.

(21) Appl. No.: 18/463,822

(22) Filed: Sep. 8, 2023

(65) Prior Publication Data

US 2024/0093777 A1 Mar. 21, 2024

Related U.S. Application Data

(60) Provisional application No. 63/375,042, filed on Sep. 8, 2022.

(51) Int. Cl.
*F16H 57/04* (2010.01)
*B60K 1/00* (2006.01)
(Continued)

(52) U.S. Cl.
CPC ......... *F16H 57/0476* (2013.01); *F16H 48/38* (2013.01); *F16H 57/037* (2013.01);
(Continued)

(58) Field of Classification Search
CPC ........ F16H 48/38; F16H 48/40; F16H 57/037; F16H 57/0424; F16H 57/0434;
(Continued)

(56) References Cited

U.S. PATENT DOCUMENTS

| 9,126,581 | B2 | 9/2015 | Swales et al. |
| 9,707,956 | B2 | 7/2017 | Swales et al. |

(Continued)

FOREIGN PATENT DOCUMENTS

| CN | 115720022 A | * | 2/2023 | ............... B60K 1/00 |
| CN | 115720027 A | * | 2/2023 | ............... F04B 17/03 |

(Continued)

OTHER PUBLICATIONS

Machine translation of WO 87/06668 A1 obtained on Nov. 7, 2023.*
International Application Serial No. PCT/US23/73752, Search Report and Written Opinion dated Dec. 29, 2023, 10 pgs.

*Primary Examiner* — Adam D Rogers
(74) *Attorney, Agent, or Firm* — Polygon IP, LLP

(57) ABSTRACT

Described herein are methods and systems of a drive unit of an electric commercial vehicle. The drive unit may include an electric motor, a transmission, and a differential. The electric motor, transmission, and differential may share lubrication and cooling fluids. Various features for collecting and distribution the lubrication and cooling fluids are also described herein.

16 Claims, 18 Drawing Sheets

(51) Int. Cl.
*F16H 48/38* (2012.01)
*F16H 57/037* (2012.01)

(52) U.S. Cl.
CPC ..... *F16H 57/0424* (2013.01); *F16H 57/0434* (2013.01); *F16H 57/045* (2013.01); *F16H 57/0471* (2013.01); *B60K 1/00* (2013.01); *B60K 2001/001* (2013.01); *B60K 2001/006* (2013.01)

(58) Field of Classification Search
CPC ............... F16H 57/045; F16H 57/0471; F16H 57/0476; B60K 1/00; B60K 2001/001; B60K 2001/006
See application file for complete search history.

(56) References Cited

U.S. PATENT DOCUMENTS

| | | | |
|---|---|---|---|
| 9,840,141 | B2 | 12/2017 | Ooki et al. |
| 10,270,314 | B2 | 4/2019 | Matsuda |
| 10,439,477 | B2 | 10/2019 | Pinkley et al. |
| 10,511,210 | B2 | 12/2019 | Yu |
| 10,538,238 | B2 | 1/2020 | Swales et al. |
| 10,746,282 | B2 * | 8/2020 | Ito ................... F16H 57/0471 |
| 10,780,849 | B1 | 9/2020 | Garcia et al. |
| 10,865,873 | B2 * | 12/2020 | Ishikawa ........... F16H 57/0476 |
| 11,323,006 | B1 | 5/2022 | Mason et al. |
| 11,333,238 | B2 * | 5/2022 | Ishikawa ........... F16H 57/0495 |
| 11,421,774 | B2 * | 8/2022 | Tamura ............. F16H 57/0483 |
| 11,578,798 | B2 * | 2/2023 | Nakata .............. F16H 57/0483 |
| 11,732,795 | B2 * | 8/2023 | Ishikawa ........... F16H 57/0424 |
| | | | 475/150 |
| 11,773,962 | B1 * | 10/2023 | Vanderlip ........... F16H 57/0424 |
| | | | 74/606 A |
| 2014/0335995 | A1 | 11/2014 | Swales et al. |
| 2015/0222162 | A1 | 8/2015 | Pinkley et al. |
| 2015/0336573 | A1 | 11/2015 | Swales et al. |
| 2015/0337948 | A1 | 11/2015 | Leitgeb et al. |
| 2017/0282909 | A1 | 10/2017 | Swales et al. |
| 2020/0240314 | A1 | 7/2020 | Goto et al. |
| 2021/0175779 | A1 | 6/2021 | Kim |
| 2022/0049768 | A1 * | 2/2022 | Nakamatsu ........... F16H 57/045 |
| 2022/0090673 | A1 | 3/2022 | Tamai et al. |
| 2022/0185122 | A1 * | 6/2022 | Fukunaga ............. H02K 7/116 |
| 2022/0194230 | A1 * | 6/2022 | Fukunaga ........... F16H 57/0413 |
| 2022/0196135 | A1 * | 6/2022 | Tamura ................ F16H 57/021 |
| 2022/0281310 | A1 * | 9/2022 | Nakata ............... F16H 57/0457 |
| 2022/0282783 | A1 * | 9/2022 | Nakata ............... F16H 57/0476 |
| 2022/0286011 | A1 * | 9/2022 | Nakata .................. H02K 7/083 |
| 2022/0321050 | A1 * | 10/2022 | Jono .................. F16H 57/0413 |
| 2022/0371421 | A1 | 11/2022 | Tanizawa |
| 2022/0376588 | A1 * | 11/2022 | Nakamura ........... F16H 57/0417 |
| 2023/0006501 | A1 | 1/2023 | Mason et al. |
| 2023/0067898 | A1 * | 3/2023 | Oki .................... F16H 57/0409 |
| 2023/0341043 | A1 * | 10/2023 | Garmel .............. F16H 57/0435 |

FOREIGN PATENT DOCUMENTS

| | | | |
|---|---|---|---|
| DE | 102019117494 | A1 * | 12/2020 |
| JP | 2017155888 | A | 9/2017 |
| JP | 6215613 | B2 | 10/2017 |
| KR | 101755028 | B1 | 7/2017 |
| WO | 8706668 | A1 | 11/1987 |
| WO | WO-8706668 | A1 * | 11/1987 |
| WO | WO-2019178848 | A1 * | 9/2019 |

* cited by examiner

ELECTRIC COMMERCIAL VEHICLE DRIVE UNIT

CROSS-REFERENCE TO RELATED APPLICATION

This application claims the benefit under 35 U.S.C. § 119(e) of U.S. Provisional Patent Application No. 63/375,042, entitled "Electric Commercial Vehicle Drive Unit" and filed on 2022 Sep. 8, which is incorporated herein by reference in its entireties for all purposes.

BACKGROUND

Electric motors are used in electric vehicles and other applications to produce mechanical energy from electrical energy. The mechanical energy provides motive torque to the electric vehicle. The electric motors may transmit the mechanical energy via drivetrain components. The electric motor and drivetrain components generate heat during operation. Cooling of the electric motor and drivetrain components is, thus, needed in order to safely and reliably operate the vehicle.

SUMMARY

Described herein are electric drive units. In a certain embodiment, the commercial electric vehicle drive unit comprises a housing, an electric motor, comprising stator windings and a stator core and disposed within a cavity of the housing, a transmission, disposed within the cavity, a differential, disposed within the cavity, a lower sump, configured to house a lubricant shared between the electric motor, the transmission and the differential, and an upper sump, disposed above the electric motor and configured to receive the lubricant from the lower sump and distribute the lubricant to at least the stator windings and the stator core.

A certain embodiment further comprises a pump, configured to distribute the lubricant from the lower sump to the upper sump via a first oil circuit. A certain embodiment further comprises a thermostat, configured to control the distribution of the lubricant from the lower sump to the upper sump.

In a certain embodiment the upper sump distributes the lubricant to the stator windings via a first oil exit and distributes the lubricant to the stator core via a second oil exit. In a certain embodiment, the upper sump comprises a first reservoir and a second reservoir. In a certain embodiment, the first reservoir and the second reservoir are separate. In a certain embodiment, the upper sump further comprises a linking portion linking the first reservoir and the second reservoir and allowing for the lubricant to flow between the first reservoir and the second reservoir. In a certain embodiment, the upper sump further comprises a side channel. In a certain embodiment, the first oil exit is disposed within the first reservoir or the second reservoir, and the second oil exit is disposed within the side channel. In a certain embodiment, the upper sump receives the lubricant from a first oil circuit. In a certain embodiment, the first oil circuit and the linking portion are non-linearly disposed. In a certain other embodiment, the first oil circuit is configured to receive the lubricant from the lower sump. In a certain embodiment, the lower sump is configured to provide the lubricant to the first oil circuit and a second oil circuit separate from the upper sump, and the second oil circuit is configured to provide the lubricant to a first bearing. In a certain embodiment, the upper sump is further configured to provide the lubricant to a second bearing.

In a certain embodiment, the differential comprises a flangeless differential carrier and a drive gear coupled to the flangeless differential carrier. In a certain embodiment, the flangeless differential carrier comprises a plurality of carrier bolt holes, each carrier bolt hole configured to receive a bolt to couple the drive gear to the flangeless differential carrier. In a certain embodiment, at least one of the carrier bolt holes is a blind bolt hole.

In a certain embodiment, the transmission and/or the differential comprises: a bearing. In a certain embodiment, the housing further comprises a housing rib disposed within an interior of the cavity and configured to receive oil and guide the oil to the bearing. In a certain embodiment, the housing rib is configured to guide oil to a relief disposed around the bearing and configured to receive the oil from the housing rib.

These and other embodiments are described further below with reference to the figures.

Clauses

Clause 1. A commercial electric vehicle drive unit, comprising: a housing; an electric motor, comprising stator windings and a stator core and disposed within a cavity of the housing; a transmission, disposed within the cavity; a differential, disposed within the cavity; a lower sump, configured to house a lubricant shared between the electric motor, the transmission and the differential; and an upper sump, disposed above the electric motor and configured to receive the lubricant from the lower sump and distribute the lubricant to at least the stator windings and the stator core.

Clause 2. The commercial electric vehicle drive unit of clause 1, further comprising: a pump, configured to distribute the lubricant from the lower sump to the upper sump via a first oil circuit.

Clause 3. The commercial electric vehicle drive unit of clause 2, further comprising: a thermostat, configured to control the distribution of the lubricant from the lower sump to the upper sump.

Clause 4. The commercial electric vehicle drive unit of clause 1, wherein the upper sump distributes the lubricant to the stator windings via a first oil exit and distributes the lubricant to the stator core via a second oil exit.

Clause 5. The commercial electric vehicle drive unit of clause 4, wherein the upper sump comprises a first reservoir and a second reservoir.

Clause 6. The commercial electric vehicle drive unit of clause 5, wherein the first reservoir and the second reservoir are separate.

Clause 7. The commercial electric vehicle drive unit of clause 6, wherein the upper sump further comprises a linking portion linking the first reservoir and the second reservoir and allowing for the lubricant to flow between the first reservoir and the second reservoir.

Clause 8. The commercial electric vehicle drive unit of clause 7, wherein the upper sump further comprises a side channel.

Clause 9. The commercial electric vehicle drive unit of clause 8, wherein the first oil exit is disposed within the first reservoir or the second reservoir, and wherein the second oil exit is disposed within the side channel.

Clause 10. The commercial electric vehicle drive unit of clause 8, wherein the upper sump receives the lubricant from a first oil circuit.

Clause 11. The commercial electric vehicle drive unit of clause 10, wherein the first oil circuit and the linking portion are non-linearly disposed.

Clause 12. The commercial electric vehicle drive unit of clause 10, wherein the first oil circuit is configured to receive the lubricant from the lower sump.

Clause 13. The commercial electric vehicle drive unit of clause 12, wherein the lower sump is configured to provide the lubricant to the first oil circuit and a second oil circuit separate from the upper sump, and wherein the second oil circuit is configured to provide the lubricant to a first bearing.

Clause 14. The commercial electric vehicle drive unit of clause 4, wherein the upper sump is further configured to provide the lubricant to a second bearing.

Clause 15. The commercial electric vehicle drive unit of clause 1, wherein the differential comprises a flangeless differential carrier and a drive gear coupled to the flangeless differential carrier.

Clause 16. The commercial electric vehicle drive unit of clause 15, wherein the flangeless differential carrier comprises a plurality of carrier bolt holes, each carrier bolt hole configured to receive a bolt to couple the drive gear to the flangeless differential carrier.

Clause 17. The commercial electric vehicle drive unit of clause 16, wherein at least one of the carrier bolt holes is a blind bolt hole.

Clause 18. The commercial electric vehicle drive unit of clause 1, wherein the transmission and/or the differential comprises: a bearing.

Clause 19. The commercial electric vehicle drive unit of clause 18, wherein the housing further comprises a housing rib disposed within an interior of the cavity and configured to receive oil and guide the oil to the bearing.

Clause 20. The commercial electric vehicle drive unit of clause 19, wherein the housing rib is configured to guide oil to a relief disposed around the bearing and configured to receive the oil from the housing rib.

DETAILED DESCRIPTION

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

It is appreciated that, for the purposes of this disclosure, when an element includes a plurality of similar elements distinguished by a letter or a dashed number following the ordinal indicator (e.g., oil circuit "1210-1", "1210-2", and "1210-3" or oil exit "1218", "1218A", "1218B", or 1218C) and reference is made to only the ordinal indicator itself (e.g., "1210" or "1218"), such a reference is applicable to all the similar elements.

Introduction

A feature of electric motors is the ability to generate high amounts of torque at near zero revolutions per minute (rpm). Accordingly, the power band of electric motors is easily accessible to drivers, allowing for maximum torque without the need to "wring out" the motor. Drivers are, thus, easily able to accelerate a vehicle with an electric motor at a high rate, leading to large amounts of heat build up in the drivetrain of the electric vehicle.

Vehicle Examples

Figure 1:
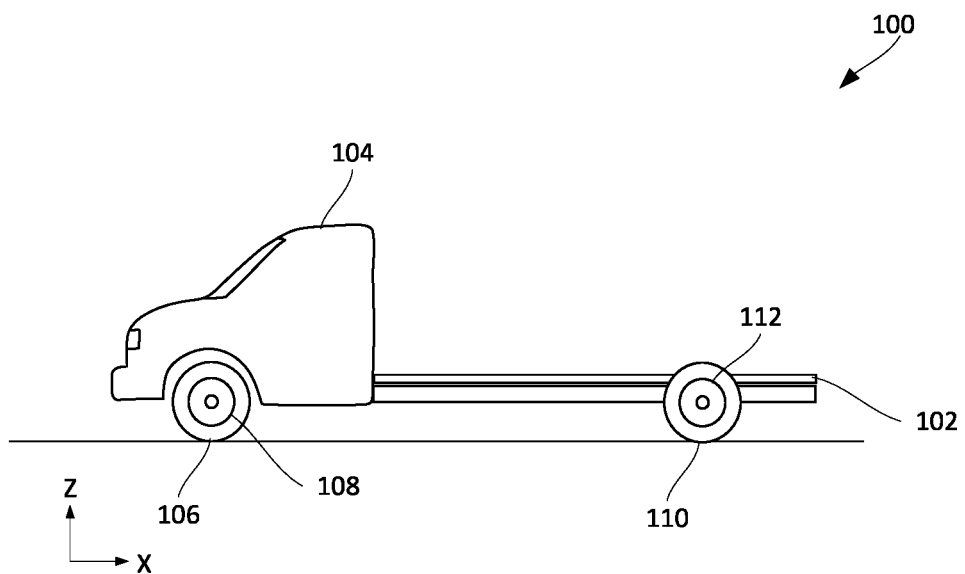
FIG. 1 illustrates a vehicle, in accordance with certain embodiments.

FIG. 1 illustrates a vehicle, in accordance with certain embodiments. FIG. 1 illustrates vehicle 100 that includes chassis 102, cab 104, front tire 106, front wheel 108, rear tire 110, and rear wheel 112. In certain embodiments, vehicle 100 may be a commercial vehicle with electric propulsion. Vehicle 100 may represent any type of commercial vehicle, such as a vehicle with an integrated cargo volume, (e.g., a delivery van or a box truck), a flatbed truck, a pickup truck, a truck with an enclosed cargo box, a towing vehicle, and/or any other such commercial vehicle. Chassis 102 may be any type of appropriate chassis, such as a ladder frame, unibody, monocoque, semi-monocoque, and/or other such type of chassis that may allow for vehicle 100 to provide load-carrying and/or towing ability. Though not illustrated in FIG. 1, vehicle 100 may additionally include one or more of a flatbed, truck bed, cargo container, cabin, and/or other compartment for carrying loads and/or performing tasks. In certain embodiments, vehicle 100 may be powered by one or more electric drive units (e.g., electric motors) that are mounted in various portions of vehicle 100. For example, vehicle 100 may mount one or more electric motors in front of tire 110 and wheel 112, within the frame rails of 102, and/or within another portion of vehicle 100.

Drive Unit Examples

Figure 2:
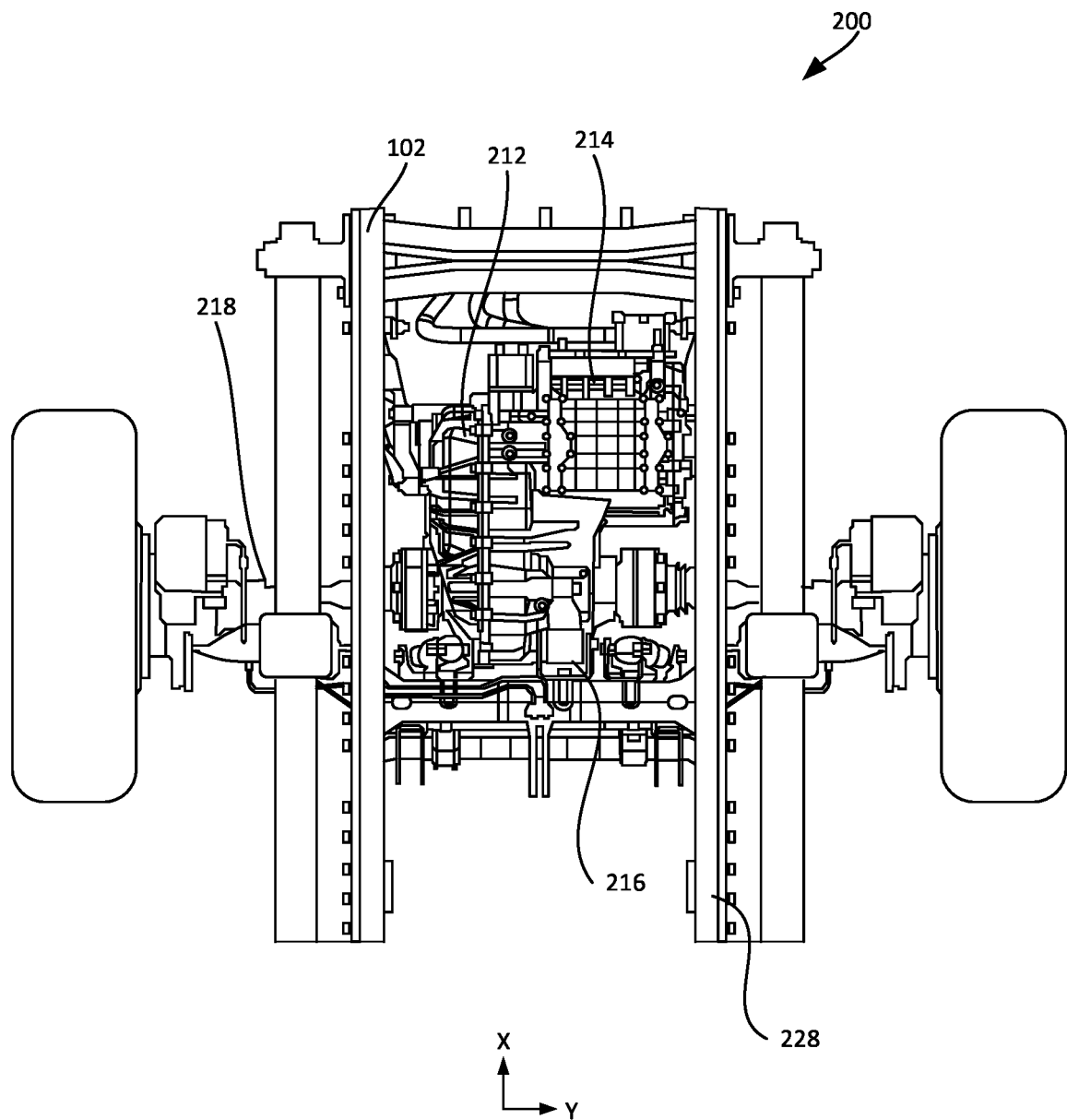
FIG. 2 is a top view of an electric commercial vehicle architecture, in accordance with certain embodiments.

FIG. 2 is a top view of an electric commercial vehicle architecture, in accordance with certain embodiments. FIG. 2 illustrates vehicle architecture 200. Vehicle architecture 200 includes chassis 102, transmission 212, electric motor 214, differential 216, and CV axle 218. Chassis 102 may include frame rails 228. One or more of transmission 212, electric motor 214, and/or differential 216 may be coupled to chassis 102 (e.g., frame rails 228) through one or more mounts, as described herein.

For the purposes of this disclosure, "drive unit" may refer to the electric powertrain of the vehicle. Accordingly, the drive unit may include one or more of an electric motor, a transmission (single or multiple speed), a differential, and/or other components for transmission of power to the wheels of the vehicle. As such, a drive unit may be powered by electricity to generate rotational motion, which may then be communicated to the wheels of the vehicle to move the vehicle.

Electric motor 214 may include one or more electric motors as well as inverters, radiators, and/or other components that support the powering and/or operation of the electric motors. In various embodiments, electric motor 214 may be powered to generate rotational movement (e.g., from electricity provided to electric motor 214 and through an output shaft of electric motor 214). Electric motor 214 may include windings, magnets, and/or other components that may convert electrical power received to rotational movement. The rotational movement may be transmitted to transmission 212, which may be a single or multi-speed transmission. Accordingly, transmission 212 may be configured to multiply the torque received from electric motor 214. Multiplication of the torque may be according to the ratio of the currently selected gear of transmission 212, whether transmission 212 is a single or multi-speed transmission. In certain embodiments, transmission 212 may be a single speed transmission that may be a single fixed speed, while in other embodiments, transmission 212 may include a plurality of different selectable speeds. Each speed may include a corresponding gear ratio.

Transmission 212 may receive torque from electric motor 214 as an input and multiply the torque and provide the multiplied torque as an output to differential 216. Differential 216 may receive the torque and distribute the torque to a plurality of wheels, such as the left and right wheel/tire assembly shown in vehicle architecture vehicle architecture 200, through CV axle 218. In various embodiments, differential 216 may be configured to divide torque between the left and right wheels based on conditions and may be a passive or active differential.

Thus, motive force generated by electric motor 214 may be transmitted to the wheels of the vehicle via transmission 212 and through differential 216 to CV axle 218. Transmission 212 may be a direct drive, a gear reduction, and/or a multi-speed transmission or transaxle. Differential 216 may be a differential that allows for wheels at opposite sides of the vehicle to spin at different speeds. Differential 216 may include an output shaft or cavity that may be configured to receive a portion of CV axle 218 and provide motive force to CV axle 218.

Electric motor 214, transmission 212, and/or differential 216 may be coupled to chassis 102 (e.g., frame rails 228). In certain embodiments, electric motor 214, transmission 212, and differential 216 may be combined as a single integrated drive unit. Electric drive unit 300 is an example of such a drive unit.

Figure 3A:
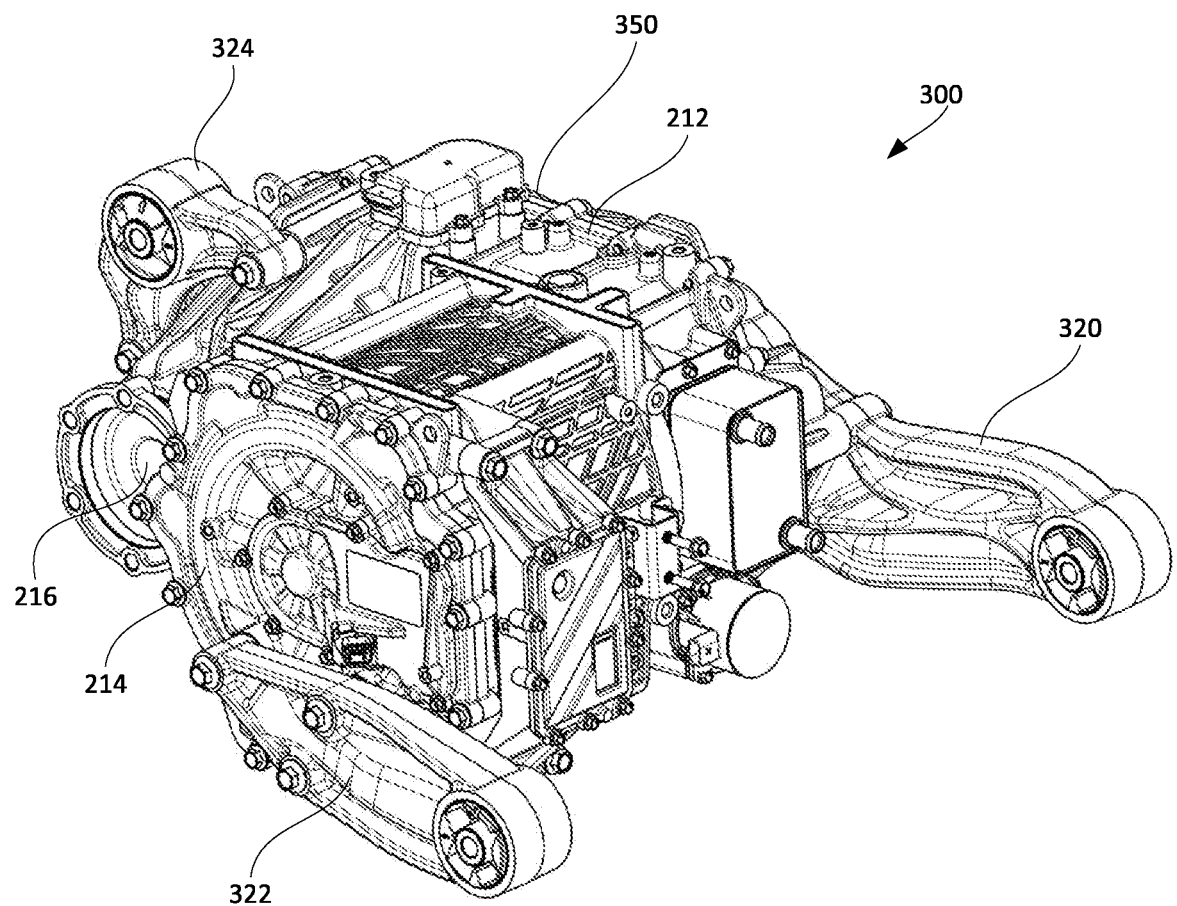
FIG. 3A illustrates an orthographic view of an electric commercial vehicle drive unit, in accordance with certain embodiments.

FIG. 3A illustrates an orthographic view of an electric commercial vehicle drive unit, in accordance with certain embodiments. Electric drive unit 300 may include electric motor 214, transmission 212, and/or differential 216 as a single assembly housed within housing 350. Housing 350 may be coupled to chassis 102 via drive unit mount 320, drive unit mount 322, and drive unit mount 324, as shown in FIG. 3A. As shown, drive unit mounts 320, 322, and 324 may be coupled to various portions of electric drive unit 300 to mount electric drive unit 300 to chassis 102. In various embodiments, drive unit mounts 320, 322, and 324 may include bearings, bushings, tabs, and/or other features to securely mount electric drive unit 300 and absorb shock or vibration.

Figure 3B:
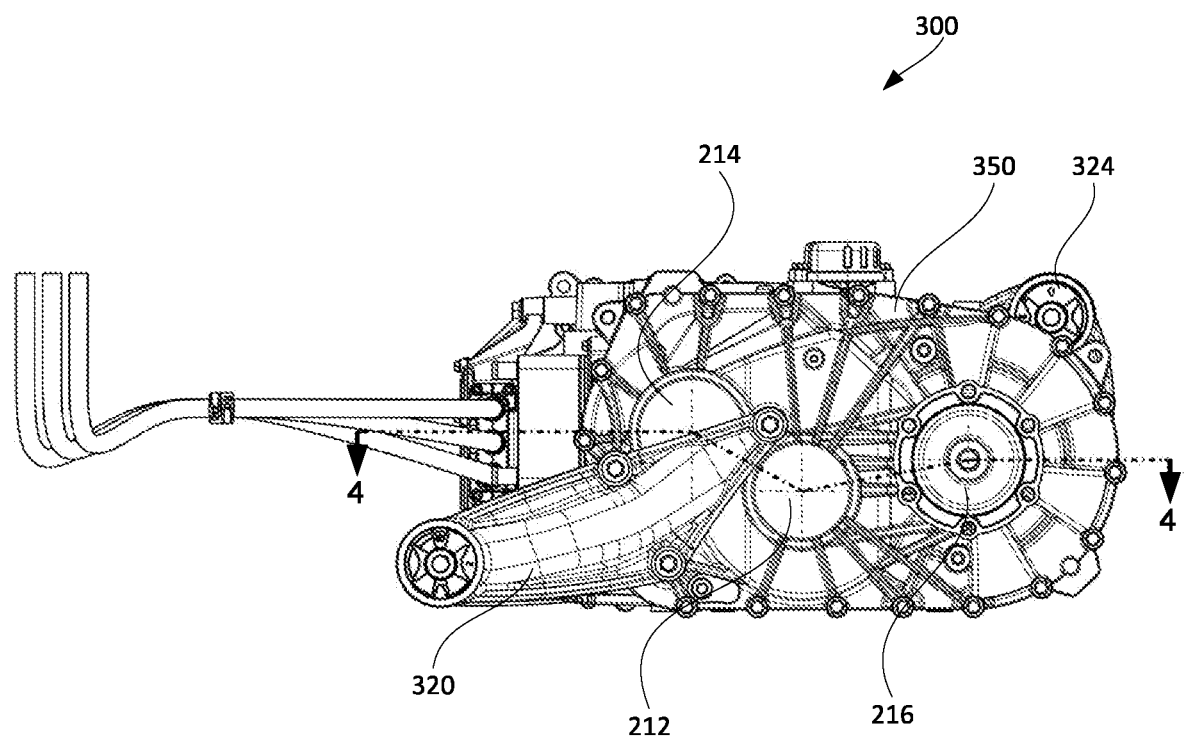
FIG. 3B illustrates a side view of the electric commercial vehicle drive unit, in accordance with certain embodiments.
Figure 4:
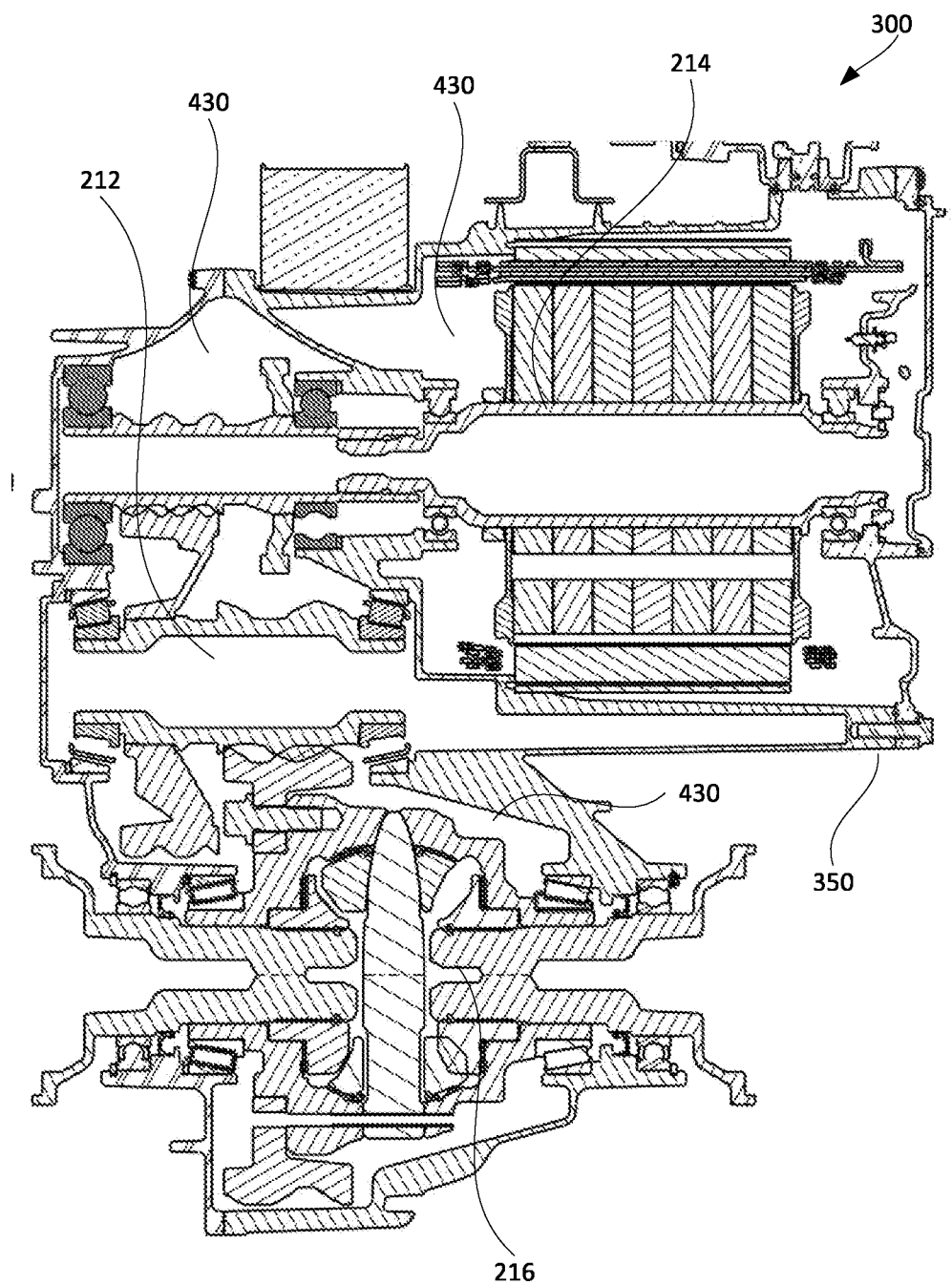
FIG. 4 illustrates a top cutaway view of the electric commercial vehicle drive unit, in accordance with certain embodiments.

In various embodiments, electric motor 214, transmission 212, and/or differential 216 may be coupled via one or more gears, driveshafts, and/or other mechanical connections. Such embodiments may dispose electric motor 214, transmission 212, and/or differential 216 in separate housings. Alternatively or additionally, as shown in FIGS. 2-4, electric drive unit 300 may dispose of electric motor 214, transmission 212, and differential 216 in a single housing, such as housing 350. Such a single housing may, in various embodiments, include a shared housing cavity to allow for electric motor 214, transmission 212, and/or differential 216 to share common fluids. FIG. 3B illustrates a side view of the electric commercial vehicle drive unit, in accordance with certain embodiments. FIG. 3B illustrates electric drive unit 300 shown in a side view. Housing 350 containing electric motor 214, transmission 212, and differential 216 are shown along with drive unit mounts 320 and 324. Furthermore, FIG. 3B illustrates cutting plane line 4-4, which is the cutting plane for the cutaway view of FIG. 4.

FIG. 4 illustrates a top cutaway view of the electric commercial vehicle drive unit, in accordance with certain embodiments. As shown in the cutaway view of FIG. 4, electric drive unit 300 may include cavity 430. Cavity 430 may be a cavity within housing 350 (e.g., may be defined by housing 350) and may be a shared cavity between electric motor 214, transmission 212, and differential 216 within housing 350. Cavity 430 and other portions of electric drive unit 300 may variously provide sumps and flow paths for oil, coolant, and/or other fluids used in operation of electric drive unit 300. Thus, the single housing of electric drive unit 300 may include a cavity where two or more of electric motor 214, transmission 212, and differential 216 may share lubrication (e.g., oil).

Figure 5:
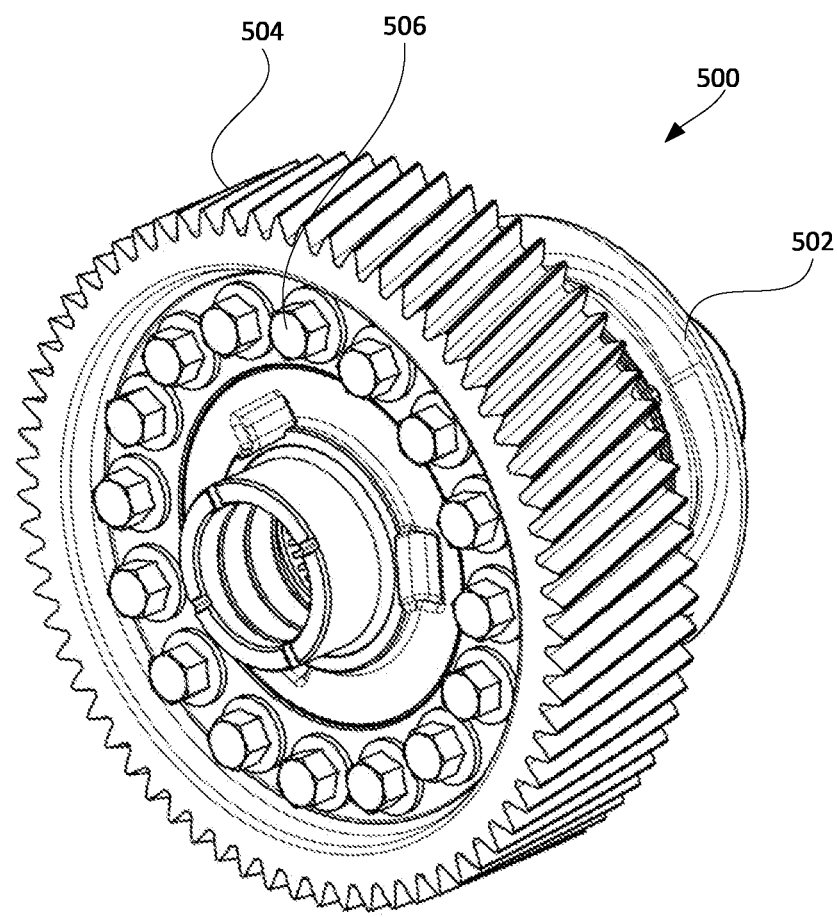
FIG. 5 illustrates an orthographic view of a differential, in accordance with certain embodiments.

FIG. 5 illustrates an orthographic view of a differential, in accordance with certain embodiments. FIG. 5 illustrates differential 500 including differential housing differential housing 502 and drive gear 504. Drive gear 504 may be coupled to differential housing 502 through a plurality of bolts 506. Bolts 506 may, thus, secure drive gear 504 to differential housing 502.

Drive gear 504, which may be referred to as a ring gear, may be a gear configured to receive input torque. Input torque may be applied to drive gear 504 (e.g., from transmission 212) and drive gear 504 may be spun due to the input torque. Spinning of drive gear 504 may also spin differential housing 502, operating differential 500 and leading to the operation of various gears and/or clutches of differential 500 to apportion power between a plurality of outputs of differential 500.

Figure 6A:
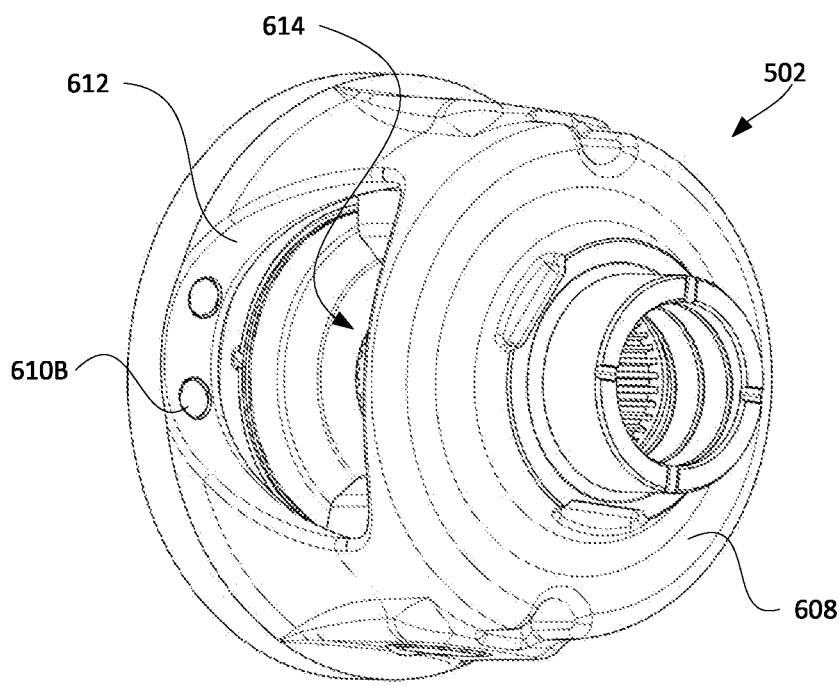
FIGS. 6A and 6B illustrate orthographic views of a differential housing, in accordance with certain embodiments.
Figure 6B:
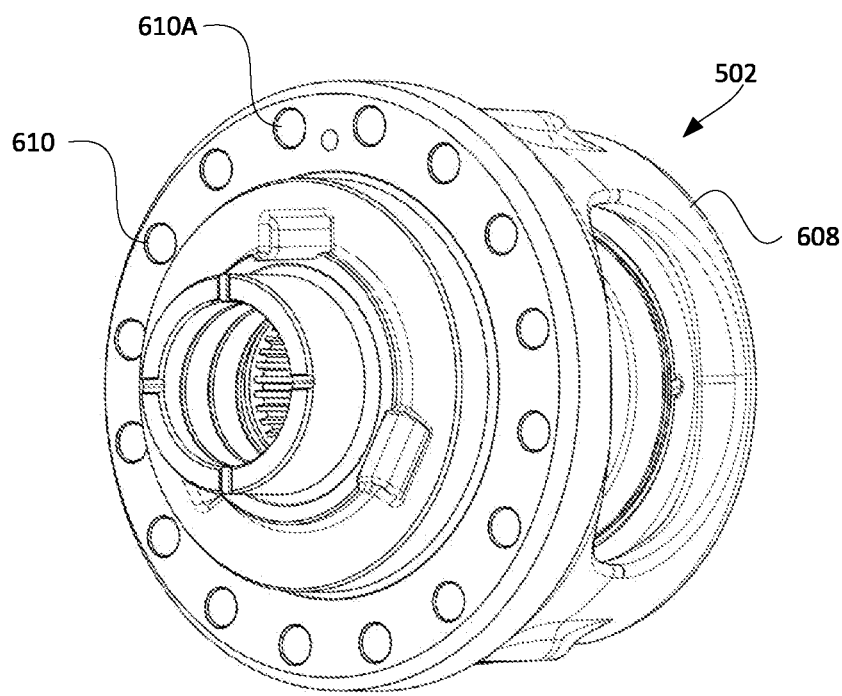

In a typical differential, the differential housing includes a flange that the drive gear is bolted to. Such a flange provides a surface for interfacing with the drive gear. FIGS. 6A and 6B illustrate orthographic views of a differential housing, in accordance with certain embodiments. As shown in FIGS. 6A and 6B, differential carrier 608 includes carrier bolt holes 610 disposed on the body of differential carrier 608. In contrast to conventional differential housings, differential carrier 608 is flangeless and, thus, does not include a flange for the mounting of a drive gear. Instead, the body of differential carrier 608 includes carrier bolt holes 610.

Carrier bolt holes 610 may be disposed within the thickness of differential carrier 608. For example, carrier bolt holes 610 may include a first opening configured to receive bolts 506. Certain carrier bolt holes, such as carrier bolt holes 610A, may be "blind" bolt-holes that may only include one opening. Such bolt-holes may end within the material of differential carrier 608. Various other carrier bolt holes, such as carrier bolt holes 610B may also include a second opening opposite the first opening that may open into the hole of openings 612, as shown in FIG. 6A. As shown, differential housing 502 includes both blind and non-blind carrier bolt holes.

In the example shown in FIGS. 6A and 6B, differential carrier 608 may include openings 612. Differential carrier 608 may include a cavity 614. Cavity 614 may house one or more gears (e.g., sun gears, planet gears, and/or other such gears), clutches, springs, and/or other devices for operation of differential 500. Openings 612 may allow for oil to pass into cavity 614 and relieve fluid pressure that may otherwise build up within cavity 614 due to operation of differential 500. Openings 612 may be formed as one or more holes cut into the thickness of differential carrier 608.

The configuration of differential carrier 608 may allow for drive gear 504 to be coupled to differential carrier 608 without requiring a flange on the differential carrier. Such a configuration may allow for a more compact differential housing and a smaller drive gear, saving space within the differential and, thus, leading to a smaller overall differential and higher ground clearance.

Transmission 212, electric motor 214, and/or differential 216 may include various oil cooling and/or collection features. Certain features may be illustrated herein.

Figure 7:
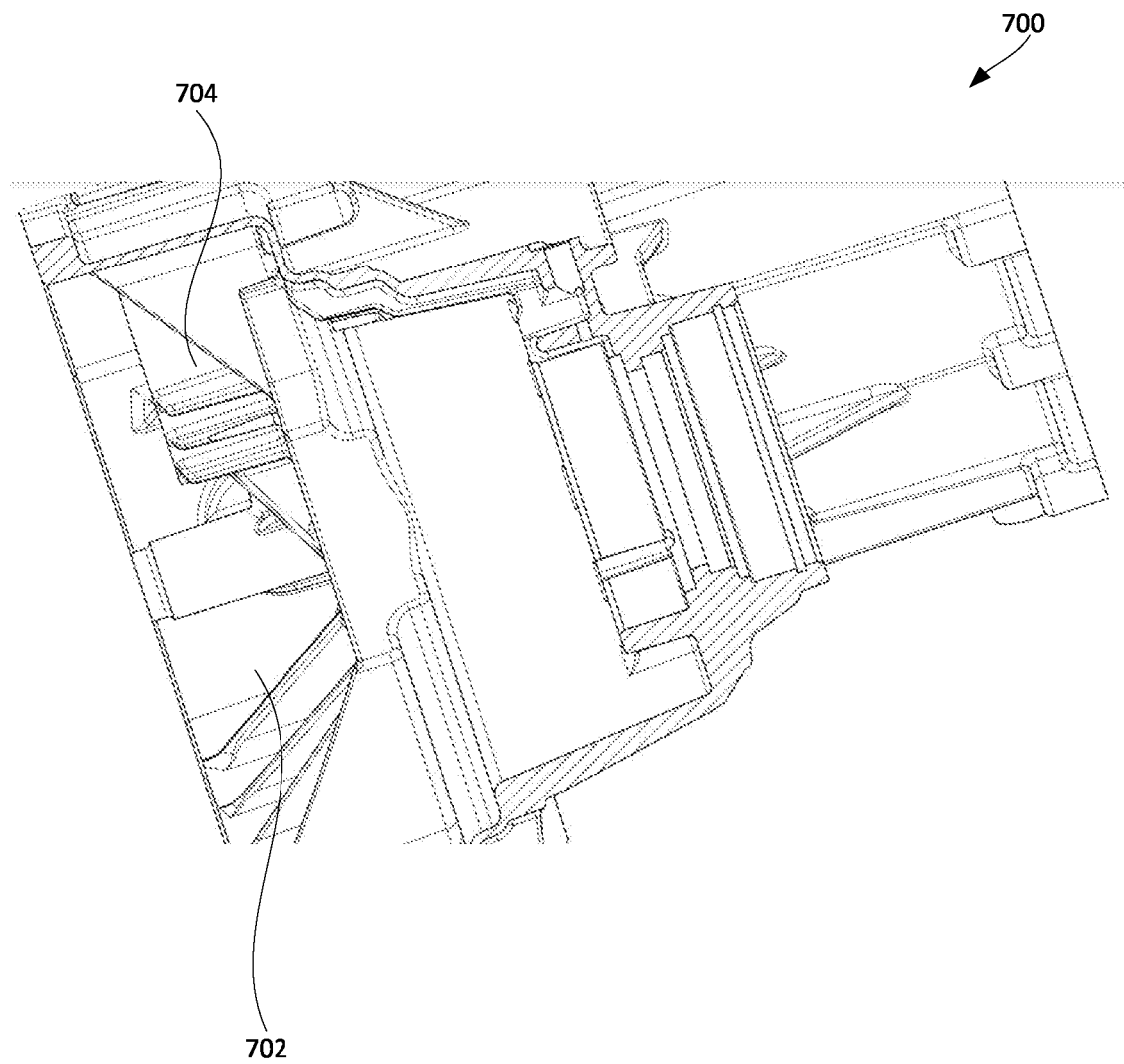
FIG. 7 is a partial interior view of a transmission housing, in accordance with certain embodiments.

FIG. 7 is a partial interior view of a transmission housing, in accordance with certain embodiments. FIG. 7 illustrates transmission housing transmission housing 700 with housing rib 704. FIG. 7 illustrates housing internal 702 that may be an inner cavity of transmission housing 700. In various embodiments, the transmission or transmission housing 700 may include one or more bearings that may support the shafts and/or gears of the transmission. The bearings require lubrication as well as cooling during operation. The oil within transmission housing 700 (and/or within cavity 430 in general) may provide lubrication as well as cooling.

Figure 8A:
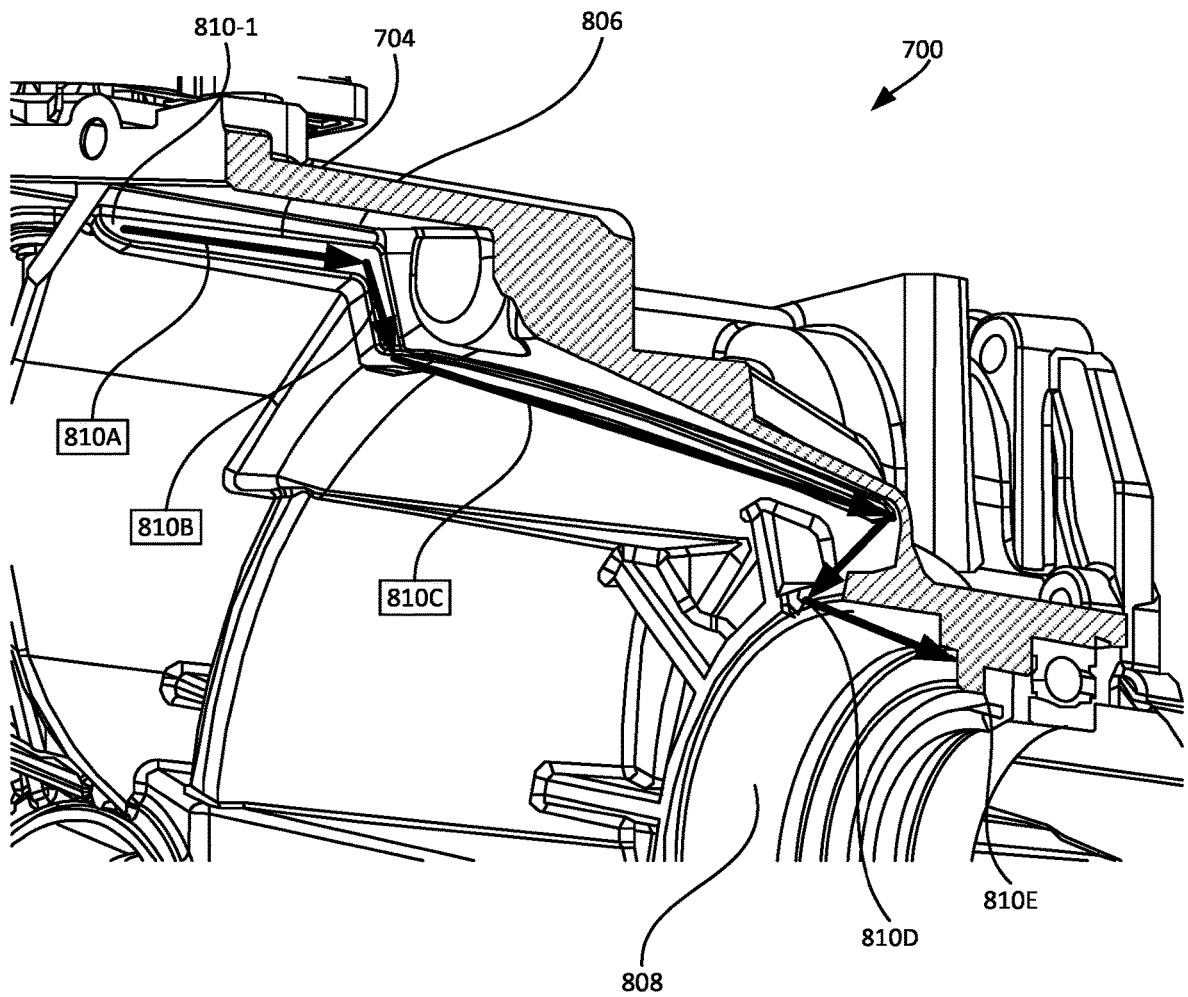
FIGS. 8A and 8B are close up views of the oil flow paths of an interior rib of the transmission housing, in accordance with certain embodiments.
Figure 8B:
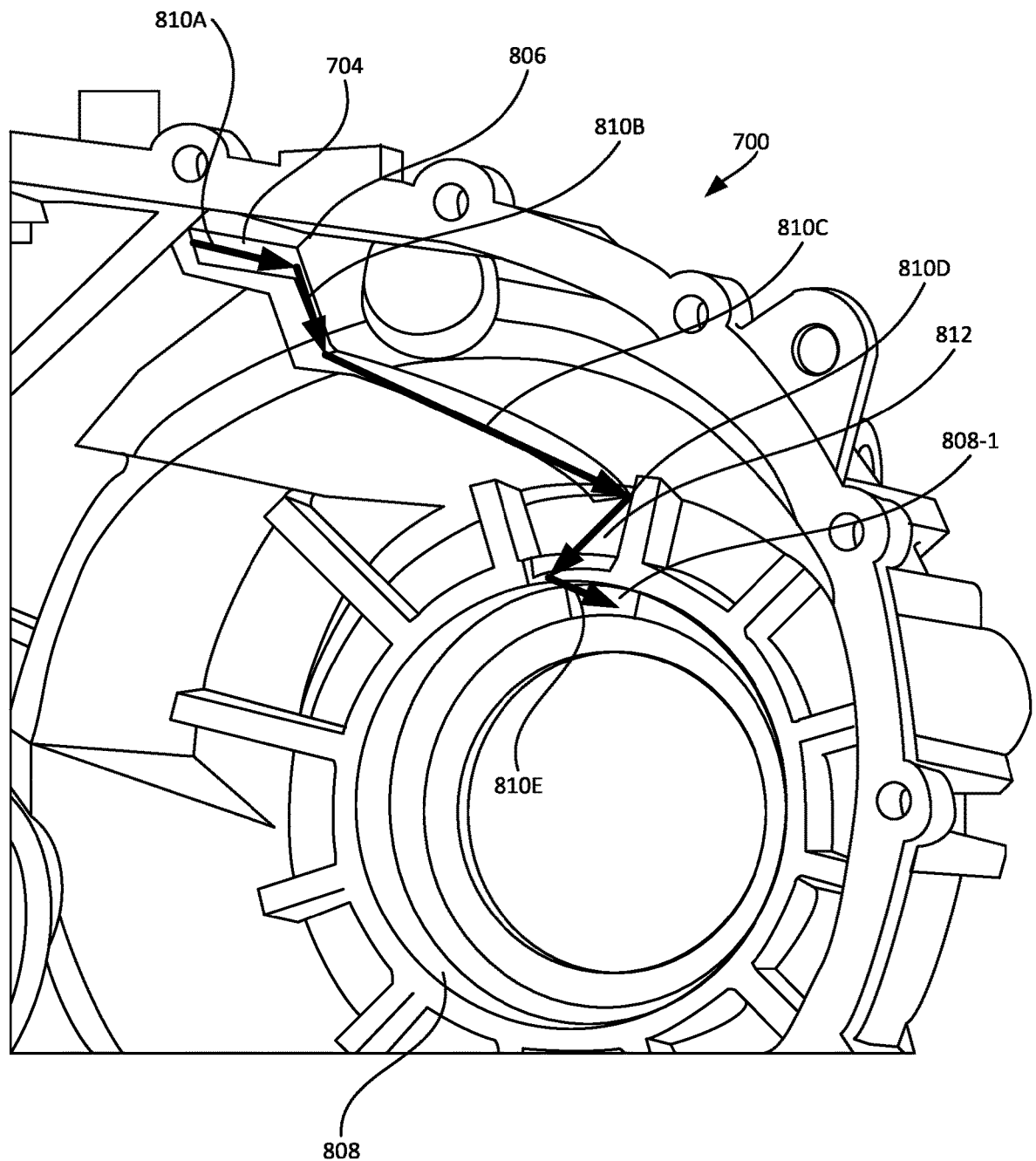

FIGS. 8A and 8B are close up views of the oil flow paths of an interior rib of the transmission housing, in accordance with certain embodiments. FIGS. 8A and 8B are close up views of certain features of the transmission housing, in accordance with certain embodiments. FIGS. 8A and 8B are further views of transmission housing 700 illustrating housing rib 704. During operation of transmission 212, gears, shafts, bearings, and/or other components may spin, causing oil to be flung within transmission housing 700. Oil flung within operation of transmission 212 may strike housing rib 704 and adhere to a portion of housing rib 704. Housing rib 704 may be an internal rib of transmission housing 700.

Housing rib 704 may be configured to allow for oil collected on housing rib 704 to flow to a bearing coupled to transmission housing 700. Such a bearing may, for example, be a bearing supporting an internal shaft (e.g., an internal shaft holding one or more gears) and allowing the internal shaft to rotate within transmission housing 700. In certain embodiments, bearing end portion 808 is configured to receive a bearing of the transmission and may be disposed on a perimeter portion of transmission housing 700.

Housing rib 704 may be a continuous rib that defines flow path 810. In various embodiments, housing rib 704 may be a rib with a first end that starts within an interior housing portion 806 of transmission housing 700 and a second end that terminates proximate to bearing end portion 808. Housing rib 704 may, in certain embodiments, include ledges, channels, flow tunnels, and/or other features to guide the flow of oil. For example, housing rib 704 may include a ledge along flow path portion 810C, which has a downward slope, to guide oil to bearing end 808.

In general, oil tends to adhere and flow along a surface. Oil that is splashed onto housing rib 704 may flow along flow path 810 to bearing end portion 808. Accordingly, for example oil that is splashed onto rib end portion 810-1 may flow along flow path portions 810A, 810B, 810C, 810D, and 810E to bearing end portion 808. Oil that is splashed on a portion of housing rib 704 closer to bearing end portion 808 may nonetheless flow along the respective portions of flow path 810 to bearing end portion 808.

FIG. 8B illustrates further details of transmission housing 700, including that of bearing end portion 808. As shown in FIG. 8B, oil that contacts housing rib 704 may flow along flow path 810 to housing end wall 812. The ribs above bearing end portion 808 may include a relief for the flow of oil. Additionally, the bearing end portion 808 may include relief 808-1. Such relief features may be features configured to allow the flow of oil from housing rib 704 into the bearing housed within bearing end portion 808.

Figure 9:
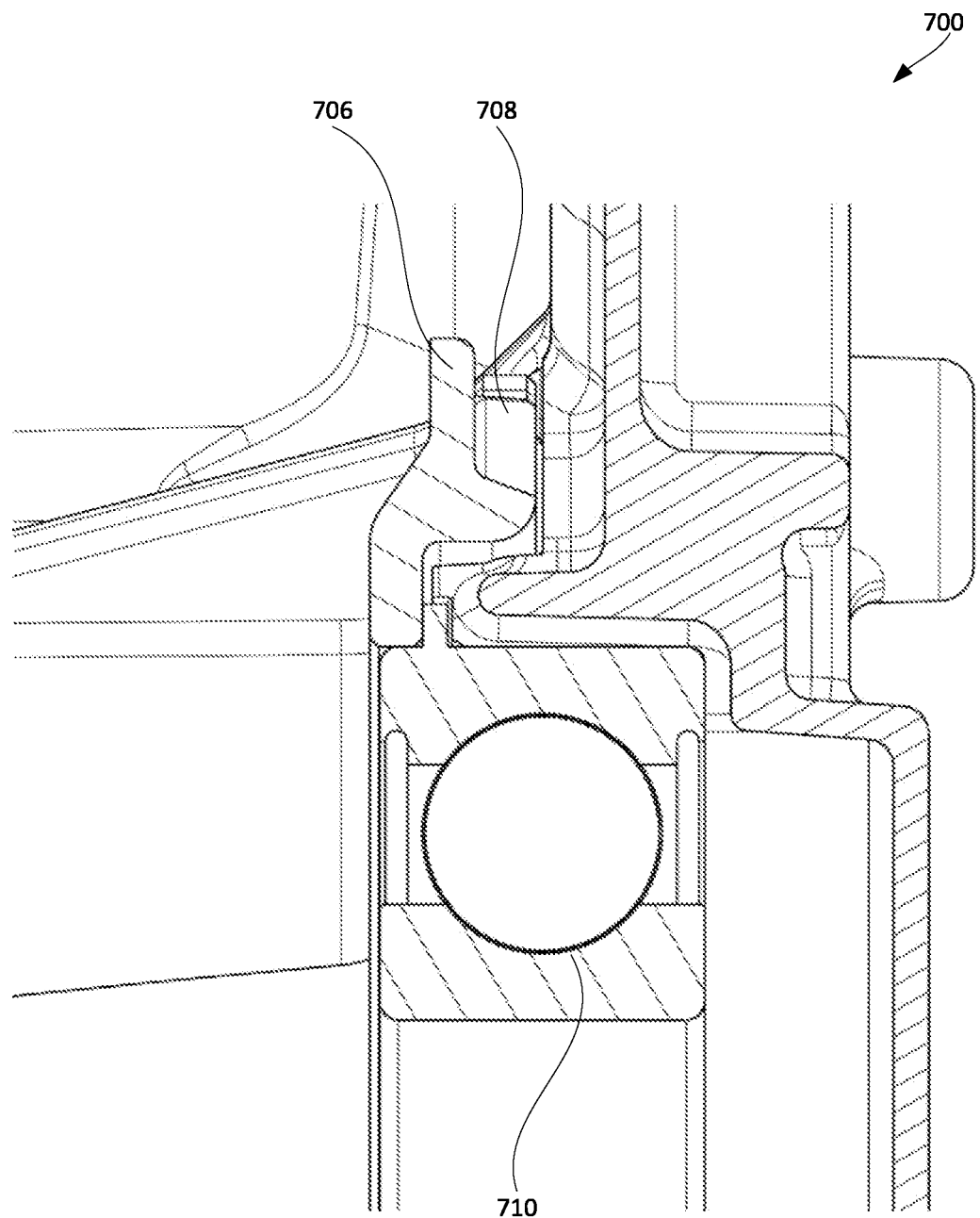
FIG. 9 is a close up cutaway view of certain features of the transmission housing, in accordance with certain embodiments.
Figure 10:
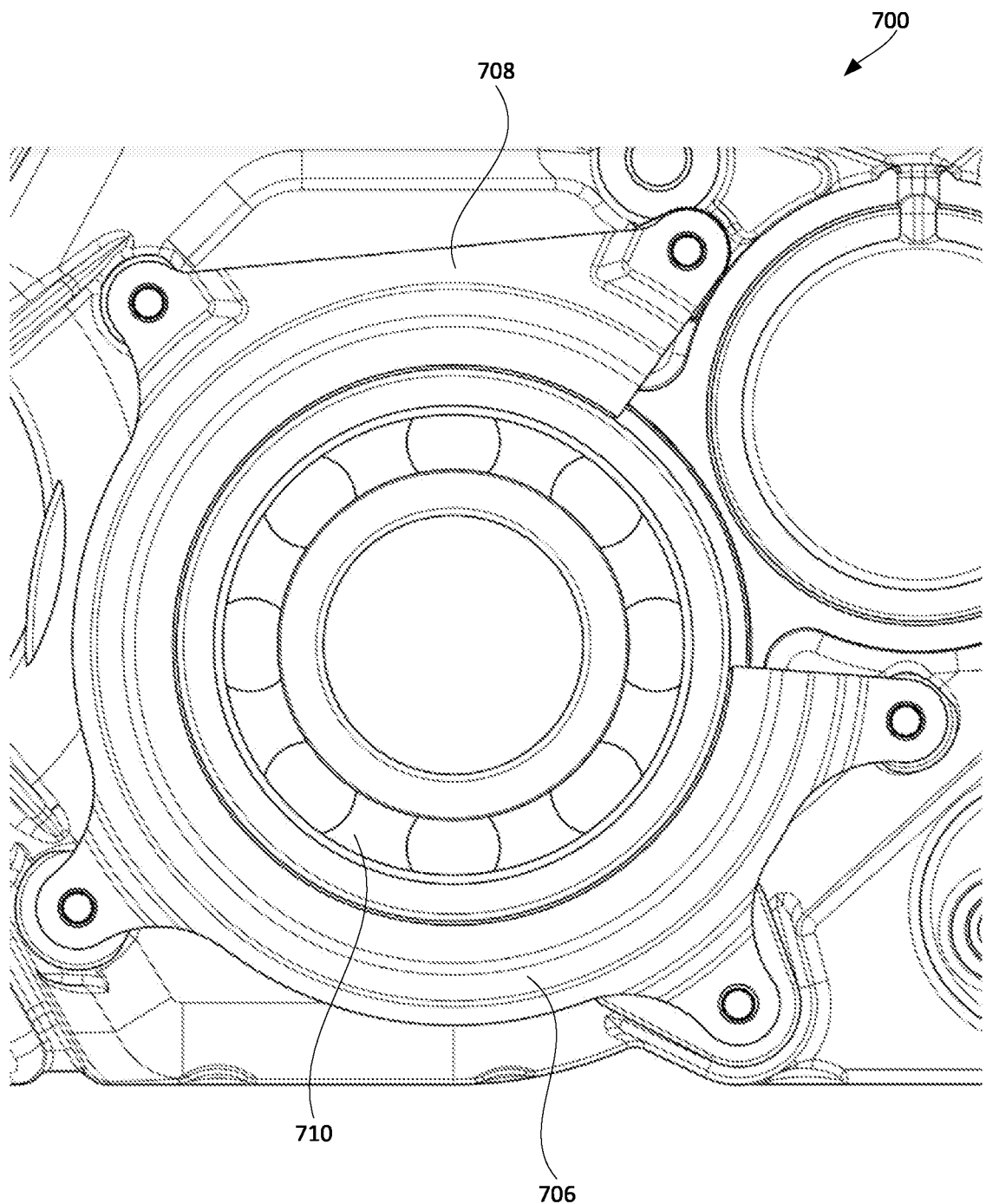
FIG. 10 is a view of a bearing, in accordance with certain embodiments.

FIG. 9 is a close up cutaway view of certain features of the transmission housing, in accordance with certain embodiments. FIG. 10 is a view of a bearing, in accordance with certain embodiments. FIGS. 9 and 10 illustrates bearing carrier 706 configured to hold bearing 710 within an opening of transmission housing 700. Bearing carrier 706 may include carrier oil collector 708, which may be an opening of bearing carrier 706 that is configured to collect oil and flow oil behind bearing carrier 706 (e.g., between bearing carrier 706 and transmission housing 700) into bearing 710, to lubricate and cool bearing 710. Thus, carrier oil collector 708 may be a form (e.g., a machined lip or sheetmetal bend) within bearing carrier 706 that provides an opening or pool for collecting and flowing oil.

In certain embodiments, bearing carrier 706 may be positioned so that carrier oil collector 708 collects oil that flows off of housing rib 704. Thus, oil striking housing rib 704 may flow downward and may be collected by carrier oil collector 708 for lubrication and cooling of bearing 710.

Figure 11:
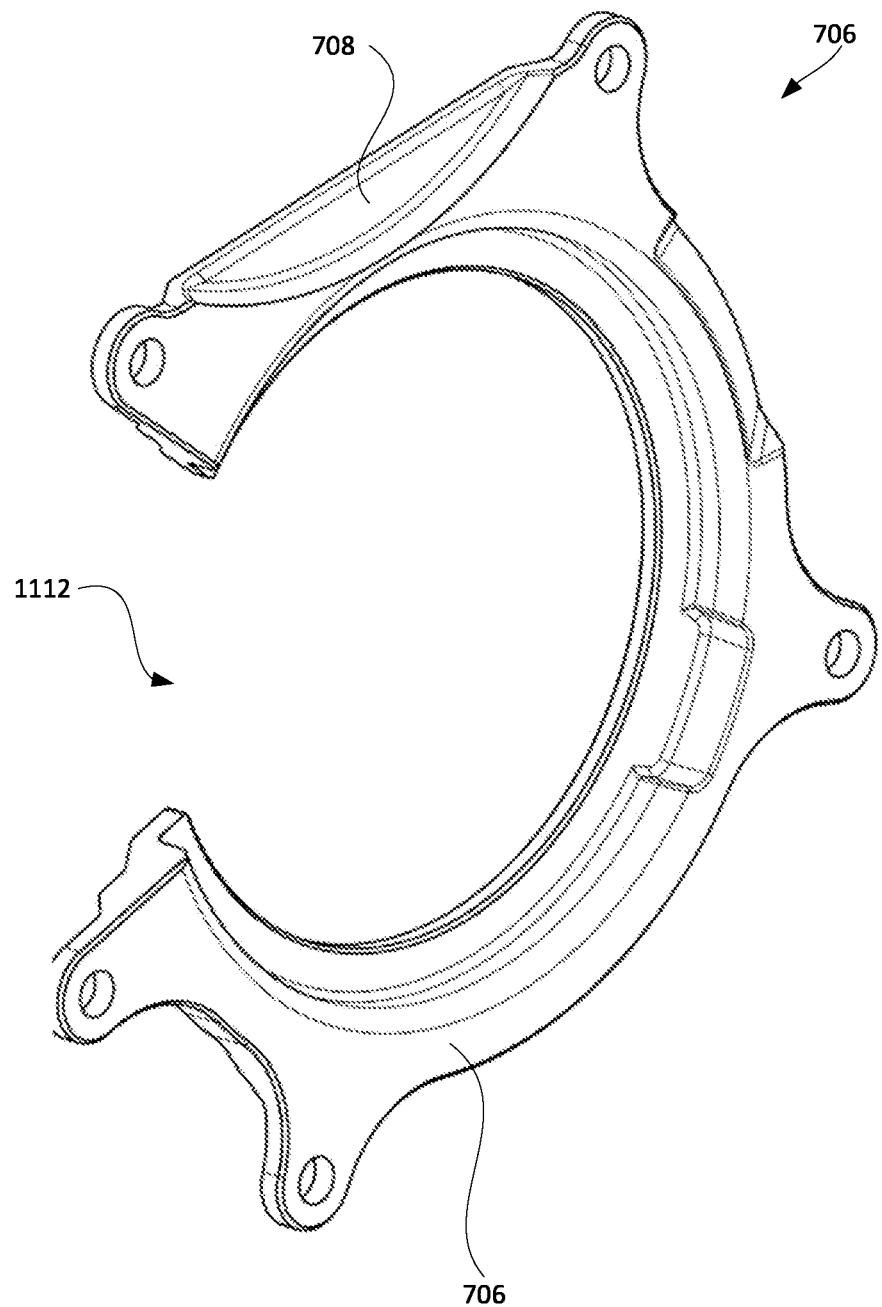
FIG. 11 is a view of a bearing carrier, in accordance with certain embodiments.

FIG. 11 is a view of a bearing carrier, in accordance with certain embodiments. FIG. 11 illustrates bearing carrier 706 that includes carrier oil collector 708. As shown in FIG. 11, carrier oil collector 708 includes an inner surface (e.g., the surface facing the bearing and/or transmission housing that bearing carrier 706 couples to) that is configured to sit proud from the bearing and/or transmission housing. Accordingly, carrier oil collector 708 creates a cavity between bearing carrier 706 and the bearing and/or transmission housing, for collection of oil. Thus, bearing carrier 706 may be utilized to lubricate otherwise difficult to lubricate bearings (e.g., bearings that are pressed into the walls of a housing, a configuration that is difficult for oil to flow into).

Furthermore, bearing carrier 706 may further include carrier opening 1112. Carrier opening 1112 may allow for oil to exit from the bearing, decreasing the build-up of oil within the bearing. Carrier opening 1112 may also allow for another path for oil to reach the bearing held by bearing carrier 706.

Figure 12:
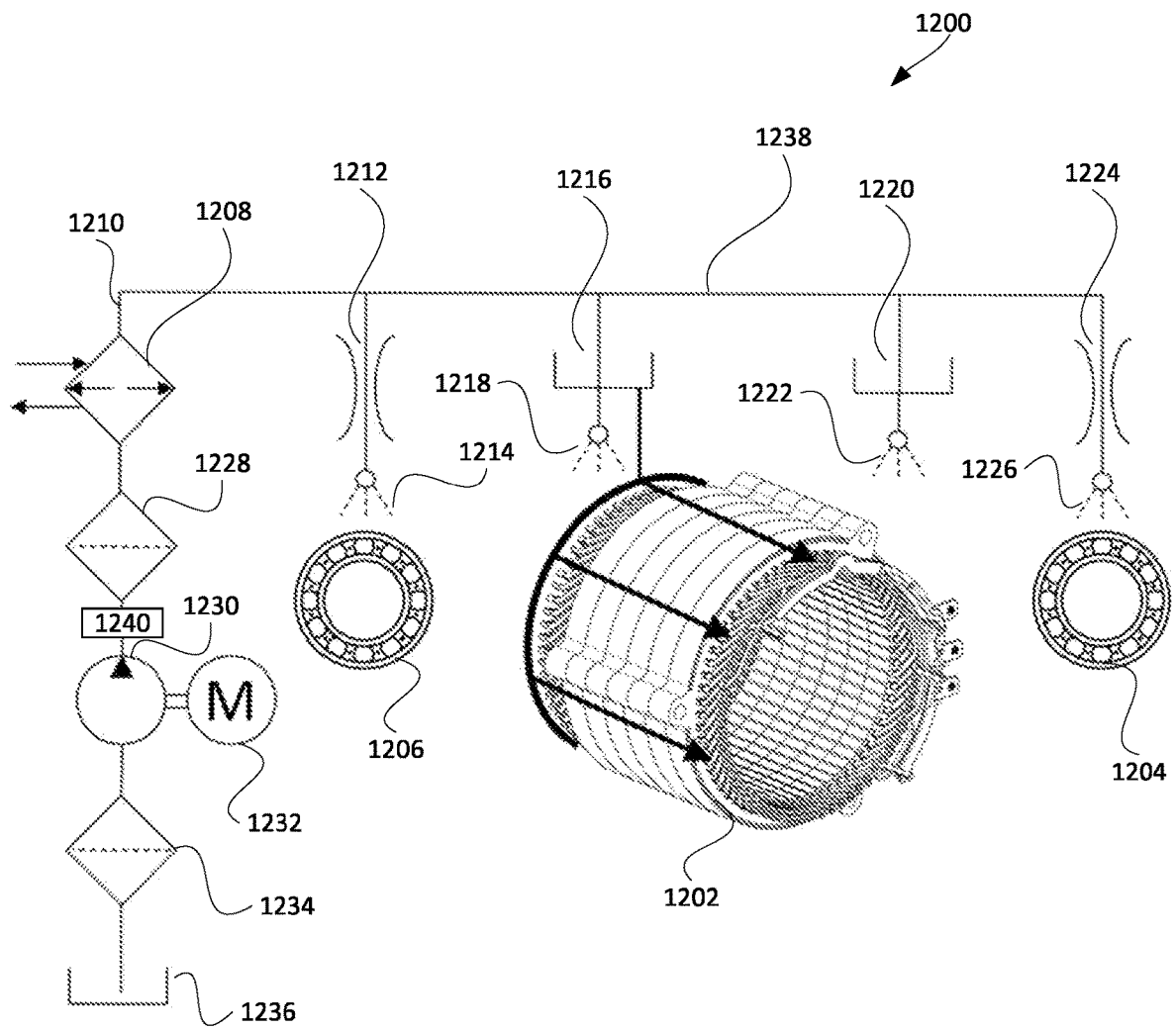
FIG. 12 is a fluid diagram of a drive unit cooling system, in accordance with certain embodiments.

FIG. 12 is a fluid diagram of a drive unit cooling system, in accordance with certain embodiments. FIG. 12 illustrates system 1200, which may include electric motor 1202, bearing 1204, and bearing 1206, lubricated with oil circuit 1210.

Electric motor 1202 may be an electric motor configured to power an electric commercial vehicle, as described herein. Thus, electric motor 1202 may be, for example, electric motor 214.

While system 1200 may illustrate a system for lubrication of electric motor 1202 and related components, it is appreciated that, as described herein, such a system may share lubrication and/or cooling fluids with that of a broader system that includes a transmission or differential. Thus, system 1200 may be disposed within a shared housing of an electric motor, transmission, and differential and such a housing may allow for fluid to be shared. The fluid of the fluid diagram of FIG. 12 may be of such shared fluid.

Bearings 1204 and 1206 may be various bearings of electric motor 1202, a transmission, and/or a differential. While system 1200 illustrates bearings 1204 and bearing 1206, it is appreciated that the systems and techniques described herein may also be used to lubricate and/or cool other components, such as gears and/or other components.

System 1200 may utilize oil from reservoir 1236 for lubrication and cooling of various systems (e.g., electric motor 1202 and/or bearings 1204 and/or 1206). Motor 1232 may power pump 1230 to pump oil from reservoir 1236 through oil circuit 1210. Reservoir 1236 may be, for example, a bottom sump of electric drive unit 300. Thus, oil utilized in electric drive unit 300 may collect within the bottom sump of reservoir 1236. Though a single pump 1230 and motor 1232 are shown in FIG. 12, it is appreciated that various embodiments of system 1200 may include any number of pumps and/or motors.

Oil pumped by pump 1230 may travel through one or more filters, such as filters 1228 and 1234, and/or thermostat 1240, configured to control the distribution of the lubricant from reservoir 1236 to upper sump 1238. Such filters may remove impurities from the oil. In various embodiments, such filters may include bypasses to allow for bypassing the flow restriction created by the filters based on conditions. As the oil may be utilized for cooling, oil pumped by pump 1230 may travel through heat exchanger 1208 and may be cooled by heat exchanger 1208. Thus, heat exchanger 1208 may be an oil cooler or radiator that allows for the oil to reject heat to air, water, or coolant mediums.

The cooled oil may then flow through oil circuit 1210. In various embodiments, at least a portion of oil circuit 1210 may be disposed substantially above the windings, gears, shafts, and/or other components of a transmission, electric motor 1202, and/or a differential. Upper sump 1238 may distribute oil to various components of electric drive unit 300, such as electric motor 1202, bearing 1204, and/or bearing 1206.

In various embodiments, oil circuit 1210 may distribute oil to bearing 1204 through restriction 1224 and via oil exit 1226. Restriction 1224 may be disposed within the oil flow path to provide a restriction to regulate the amount of oil that flows to bearing 1204. Oil exit 1226, as well as other oil exits described herein, may be a nozzle, oil sprayer, pump, oil collector, and/or other device that may be configured to provide oil to bearing 1204. In certain embodiments, restriction 1224 and/or oil exit 1226 may include a thermostat, restrictor, and/or other device that may vary the flow of oil depending on conditions (e.g., oil temperature, pressure, and/or other such conditions). Such devices may be passive or actively controlled. Similarly, bearing 1206 may receive oil through restriction 1212 and via oil exit 1214.

Electric motor 1202 may receive oil from reservoir 1216 and via oil exit 1218. Reservoir 1216 may be an upper sump that may be disposed substantially above the windings, gears, shafts, and/or other components of a transmission, electric motor 1202, and/or a differential. Thus, reservoir 1216 may not hold oil unless pump 1230 is operating to pressurize oil within oil circuit 1210. Once reservoir 1216 includes oil, such oil may then flow through respective exits (e.g., reservoir 1216, as well as other exits) to provide lubrication and cooling.

Oil exit 1218 may regulate the flow of oil from reservoir 1216. Oil from reservoir 1216 may flow via oil exit 1218 into the windings of electric motor 1202 and cool the respective windings. Oil exit 1218 may be any configuration as described herein and may, alternatively or additionally, provide for a waterfall or jet of oil to the desired portion of electric drive unit 300. In certain embodiments, oil exit 1218 may include thermostats such as wax valves to control the flow of oil to electric motor 1202.

Additionally or alternatively, reservoir 1220 may be a reservoir at the same level as reservoir 1236 or reservoir 1216 or may be at a different level. Reservoir 1220 may further provide for a reservoir that may be utilized to provide oil (e.g., via oil exit 1222) to various desired components of system 1200. Thus, reservoir 1220 may be a further sump within electric drive unit 300 that may store and provide oil to various components of electric drive unit 300. In certain embodiments, reservoir 1220 may also be pressurized by pump 1230.

In certain embodiments, reservoirs 1216 and 1220 may collectively form an "upper sump" or portion thereof. Reservoirs 1216 and 1220 may be separate from each other. That is, though reservoirs 1216 and 1220 may share oil, being separate, oil that flows between reservoirs 1216 and 1220 would need to flow between at least one intervening flow channel (e.g., linking portion 1338) and/or require the oil to change directions when flowing between reservoirs 1216 and 1220.

The upper sump may be disposed at a different level from that of reservoir 1236, such as above the level of reservoir 1236. In certain embodiments, the upper sump may be disposed above electric motor 1202. That is, during normal operation of the vehicle, the upper sump may be disposed above electric motor 1202 in a manner where the lubricant flows downward from the upper sump to electric motor 1202 through gravity.

FIGS. 13A-D are various views of the drive unit cooling system, in accordance with certain embodiments. FIGS. 13A-D may further illustrate the features of FIG. 12.

Figure 13A:
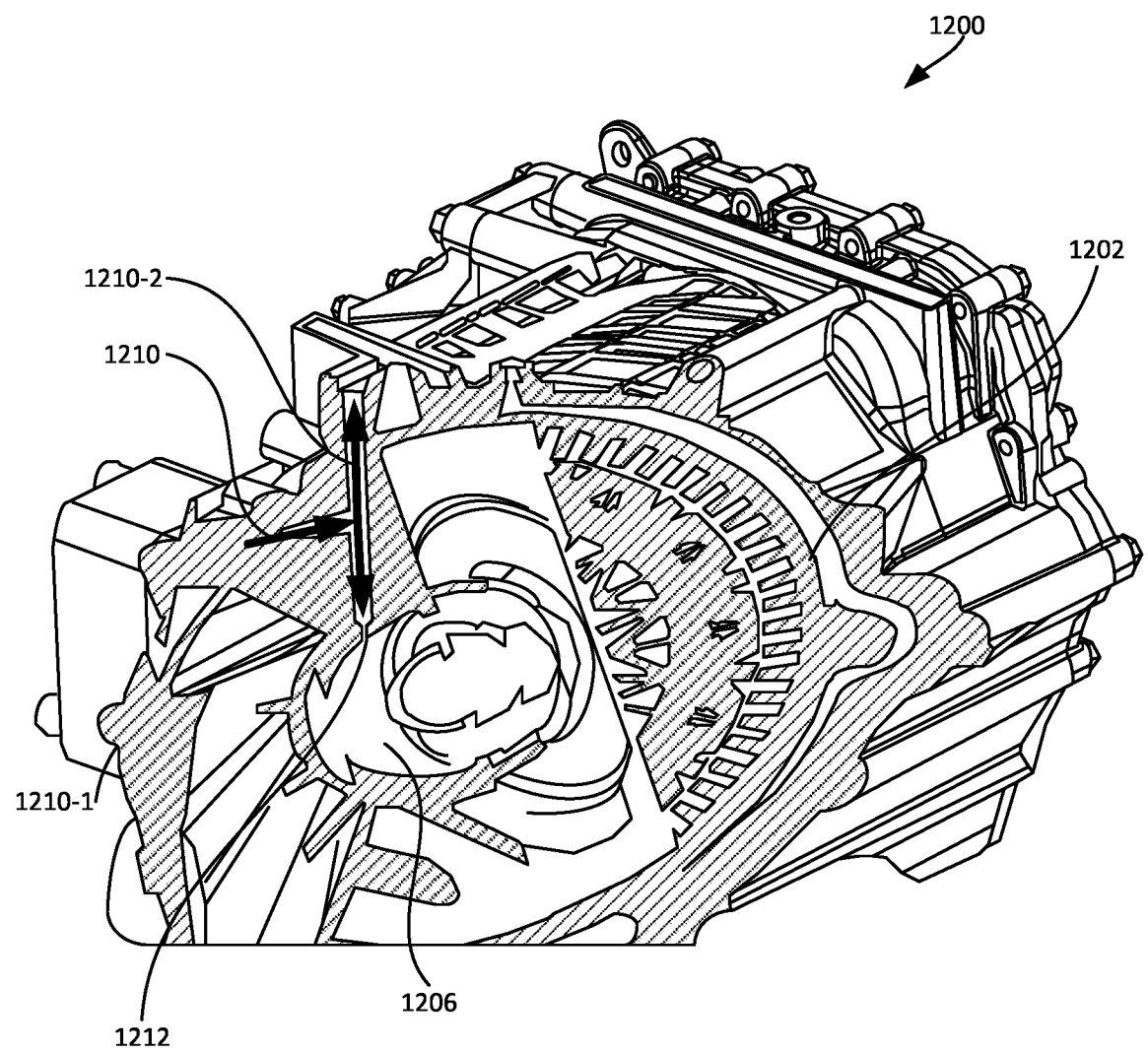
FIGS. 13A-D are various views of the drive unit cooling system, in accordance with certain embodiments.

FIG. 13A illustrates system 1200 that includes electric motor 1202 coupled to bearing 1206. Oil circuit 1210 may flow oil that originates from heat exchanger 1208 (e.g., flows from), as shown in FIG. 12, before dividing into circuit portions 1210-1 and 1201-2. Circuit portion 1210-1 may flow oil to bearing 1206, via restriction 1212. Restriction 1212 may control the flow of oil to bearing 1206, ensuring that bearing 1206 is not over lubricated and, thus, that there is not an undesirable amount of rotational drag within bearing 1206. According to the configuration of FIG. 13A, circuit portion 1210-1 may be a portion of oil circuit 1210 that lubricates bearing 1206 through a division of the flow of oil circuit 1210. As such, bearing 1206 is lubricated from oil flow that does not reach upper sump 1238.

Circuit portion 1210-2 flows oil to upper sump 1238. Oil that flows to upper sump 1238 may, in certain embodiments, be configured to lubricate various portions of electric motor 1202, bearing 1204, and/or other portions of system 1200. Upper sump 1238 may, variously, include reservoirs 1216 and 1220, linking portion 1238, circuit portion 1210-3, and/or other oil flow portions.

Figure 13B:
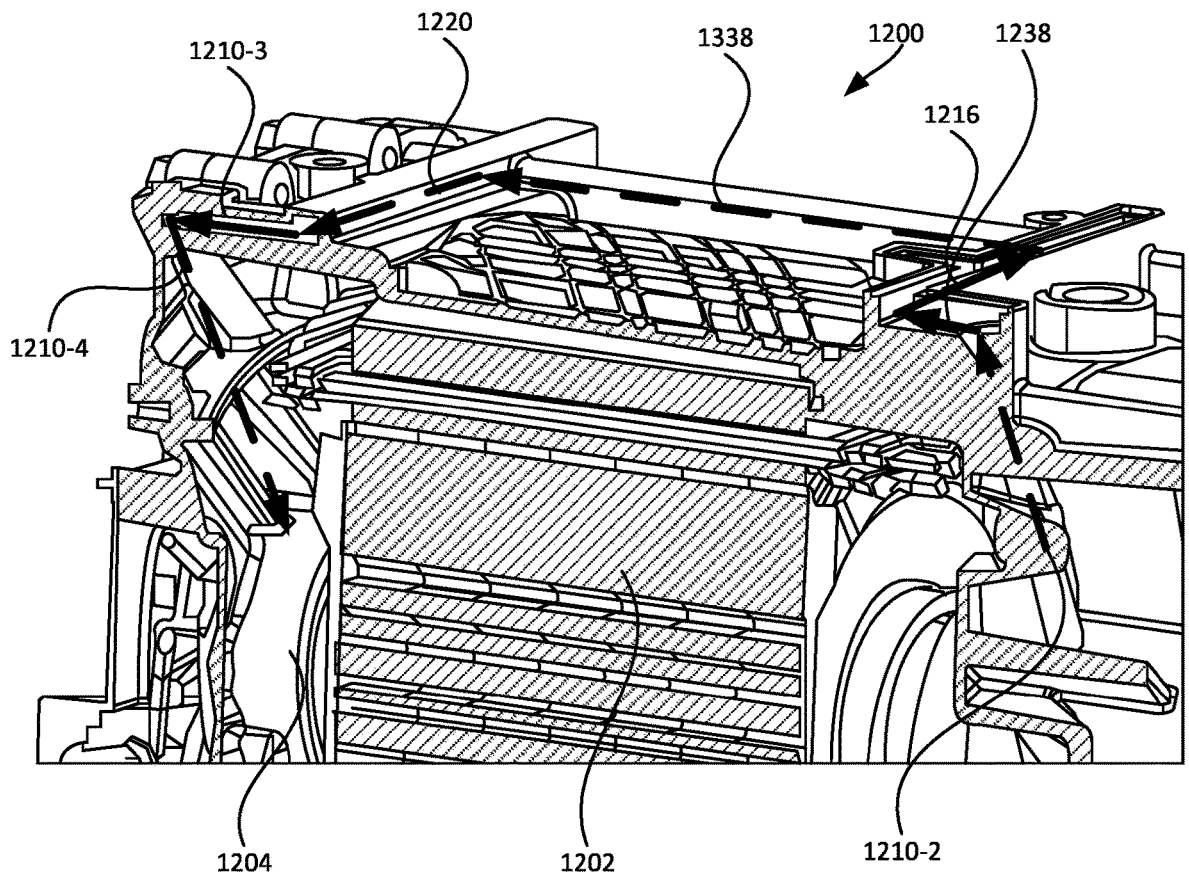

FIG. 13B illustrates a portion of upper sump 1238. As shown in FIG. 13B, circuit portion 1210-2 flows oil into upper sump 1238. Upper sump 1238 may include reservoirs 1216 and 1220, linking portion 1338, and circuit portion 1210-3. Circuit portions 1210-3 and 1210-4 may be configured to flow oil to bearing 1204.

Figure 13C:
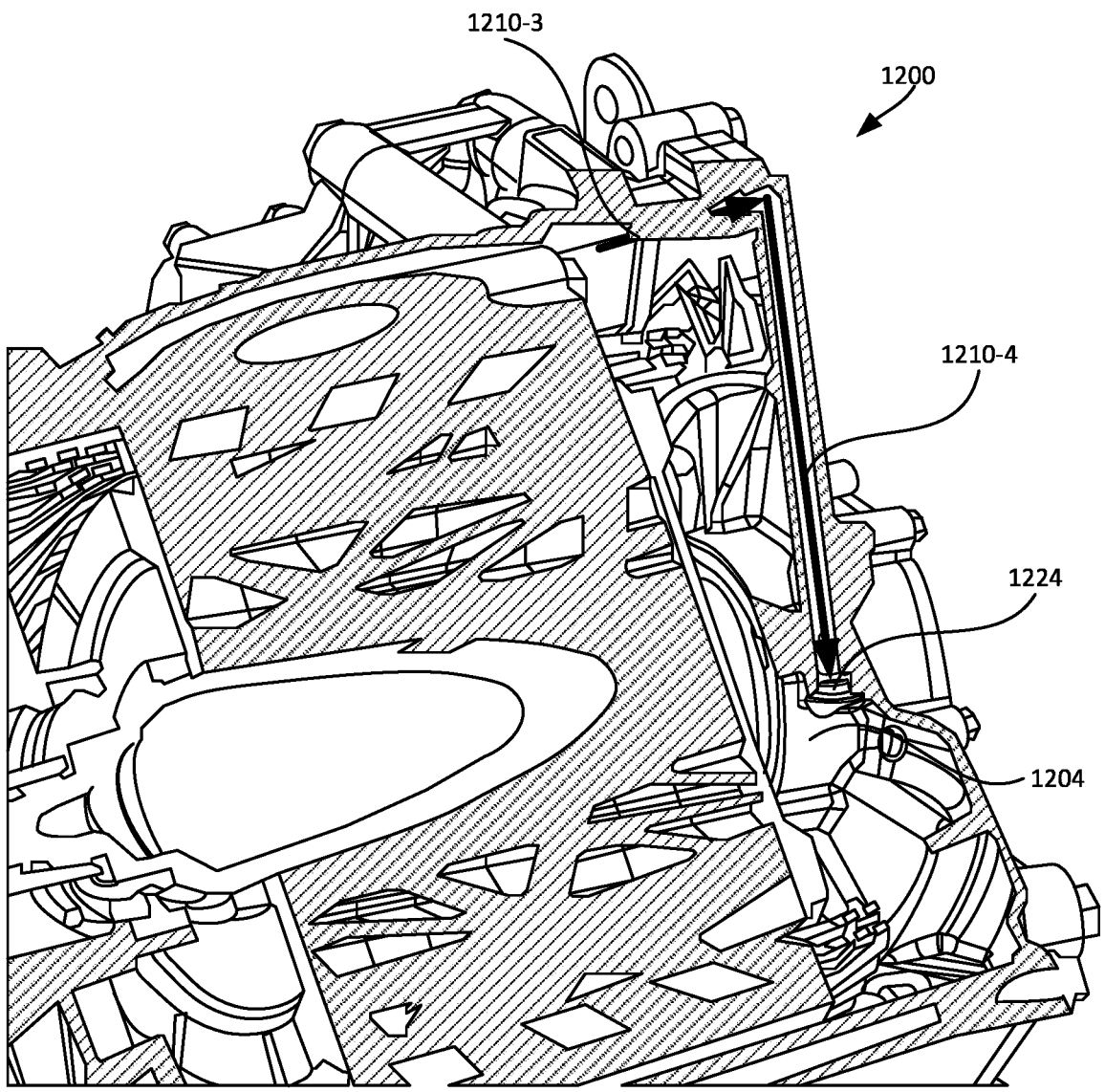

FIG. 13C further illustrates circuit portions 1210-3 and 1210-4 that are configured to flow oil to bearing 1204. As shown in FIGS. 13B and 13C, circuit portion 1210-3 is configured to flow oil from upper sump 1238 to circuit portion 1210-4. Circuit portion 1210-4 may allow for downward flow of oil from upper sump 1238 to restriction 1224. Restriction 1224 controls the amount of oil that flows to bearing 1204. As such, circuit portion 1210-4 may be configured to receive oil from upper sump 1238 for lubrication and cooling of bearing 1204.

Figure 13D:
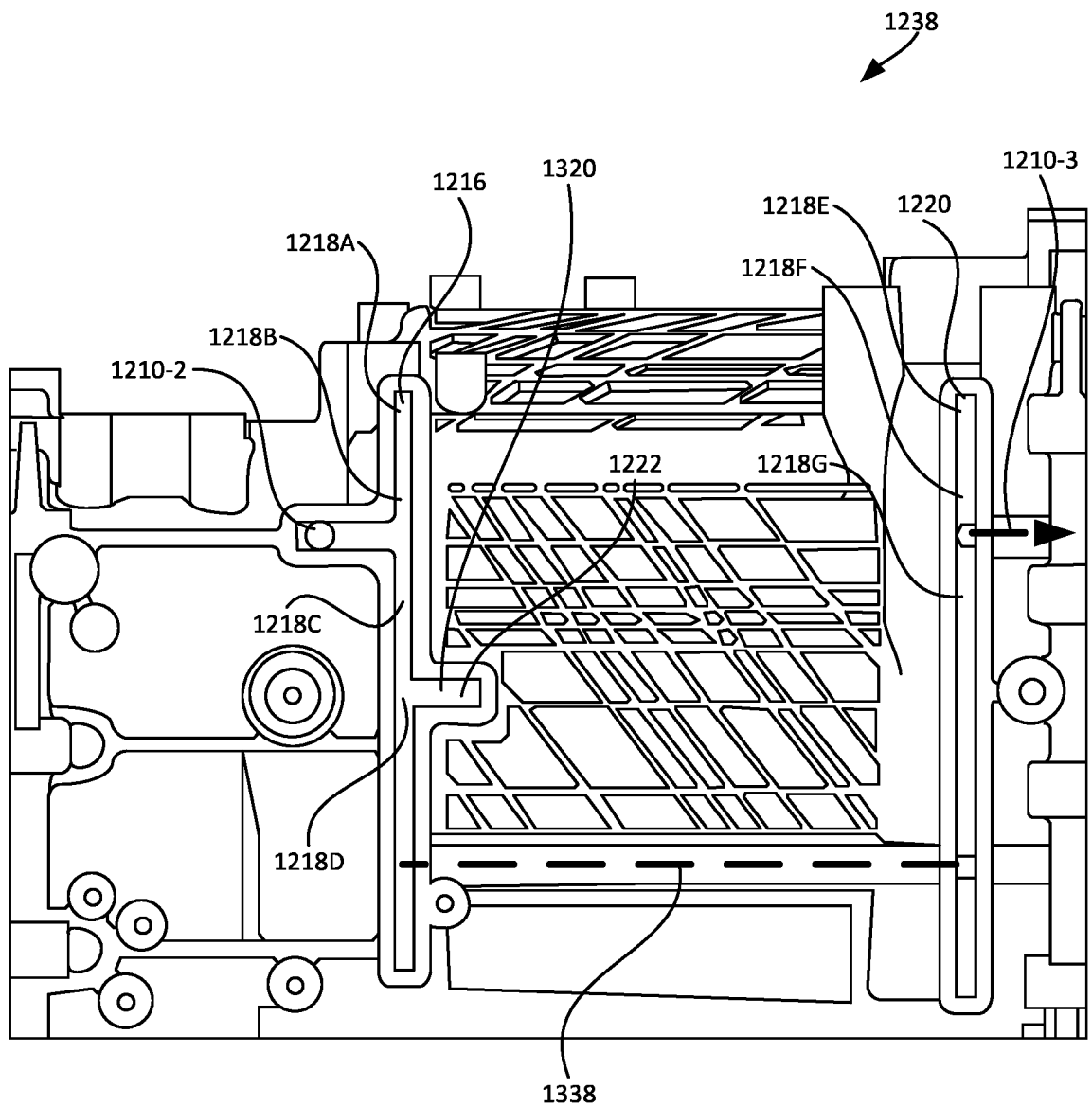

Referring back to FIG. 13B, in various embodiments, reservoirs 1216 and 1220 may include one or a plurality of oil exits to provide oil to portions of electric motor 1202. Linking portion 1338 may link reservoirs 1216 and 1220 and allow for oil to flow from reservoir 1216 to 1220 (or vice versa) so that different portions of electric motor 1202 may be lubricated and/or cooled. As shown in FIGS. 13B and 13D, linking portion 1338 may not be linear with circuit portion 1210-2 that introduces oil into reservoir 1216. That is, oil introduced into reservoir 1216 from circuit portion 1210-2 may require one or more changes in flow direction (e.g., turns) before flowing into linking portion 1338. Such a configuration increases the amount of oil that flows through oil exits within reservoir 1216 (e.g., oil exits 1218A-D as well as other oil exits as shown in FIG. 13D) by minimizing the amount of oil that bypasses reservoir 1216 by flowing directly into reservoir 1220 via linking portion 1338.

FIG. 13D illustrates a top view of upper sump 1238. Upper sump 1238 includes circuit portions 1210-2 and 1210-3, reservoirs 1216 and 1220, and linking portion 1338. Circuit portion 1210-2 may be configured to receive oil that originates from heat exchanger 1208 via circuit portion 1210. The oil may flow into reservoir 1216.

Reservoir 1216 may include one or more oil exits, such as oil exits 1218A-D and 1222, as well as additional oil exits. Linking portion 1338 may allow for oil to flow from reservoir 1216 to 1220 along the top of motor housing. Reservoir 1220 may also include one or more oil exits, such as oil exits 1218E-G, as well as additional oil exits. In certain embodiments, oil exits 1218 may be configured to flow oil to the stator windings of electric motor 1202 while oil exit 1222 may be configured to flow oil to the stator core of electric motor 1202. As such, in certain embodiments, oil exit 1222 may be an opening with a larger area than that of each individual oil exit 1218.

As shown in FIG. 13D, oil exit 1222 may be disposed in a side channel 1320 that is an offshoot of reservoir 1216. Other embodiments may dispose side channel 1320 as an offshoot of reservoir 1220, or both reservoir 1216 and 1220, either separately or as part of linking portion 1338. In the embodiment shown in FIG. 13D, the oil exits for providing oil to the stator windings are disposed within two lines. Such lines of oil exits provide oil to the ends of the stator windings and the oil may then flow along the stator windings for cooling. Thus, the oil exits of reservoir 1216 (e.g., oil exits 1218A-D as well as the additional oil exits shown) may provide oil to a first end of the stator windings while the oil exits of reservoir 1220 (e.g., oil exits 1218E-G as well as the additional oil exits shown) may provide oil to a second end of the stator windings different from the first end. Oil exit 1222 is not disposed in such a line and is, instead, disposed in a separate line (e.g., disposed in a different lateral position within the view of FIG. 13D) to provide oil targeted to specific portion(s) of the stator core.

Circuit portion 1210-3 may be configured to flow oil to bearing 1204, as described herein.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A commercial electric vehicle drive unit, comprising:
a housing;
an electric motor, comprising stator windings and a stator core and disposed within a cavity of the housing;
a transmission, disposed within the cavity;
a differential, disposed within the cavity;
a lower sump, configured to house a lubricant shared between the electric motor, the transmission and the differential; and
an upper sump, comprising a first reservoir and a second reservoir, disposed above the electric motor and configured to receive the lubricant from the lower sump and distribute the lubricant to at least the stator windings and the stator core, wherein the upper sump comprises a side channel and distributes the lubricant to the stator windings via a first oil exit and distributes the lubricant to the stator core via a second oil exit, wherein the first oil exit is disposed within the first reservoir or the second reservoir, and wherein the second oil exit is disposed within the side channel.

2. The commercial electric vehicle drive unit of claim 1, further comprising:
a pump, configured to distribute the lubricant from the lower sump to the upper sump via a first oil circuit.

3. The commercial electric vehicle drive unit of claim 2, further comprising:
a thermostat, configured to control the distribution of the lubricant from the lower sump to the upper sump.

4. The commercial electric vehicle drive unit of claim 1, wherein the first reservoir and the second reservoir are separate.

5. The commercial electric vehicle drive unit of claim 4, wherein the upper sump further comprises a linking portion linking the first reservoir and the second reservoir and allowing for the lubricant to flow between the first reservoir and the second reservoir.

6. The commercial electric vehicle drive unit of claim 5, wherein the upper sump receives the lubricant from a first oil circuit.

7. The commercial electric vehicle drive unit of claim 6, wherein the first oil circuit and the linking portion are non-linearly disposed.

8. The commercial electric vehicle drive unit of claim 6, wherein the first oil circuit is configured to receive the lubricant from the lower sump.

9. The commercial electric vehicle drive unit of claim 8, wherein the lower sump is configured to provide the lubricant to the first oil circuit and a second oil circuit separate from the upper sump, and wherein the second oil circuit is configured to provide the lubricant to a first bearing.

10. The commercial electric vehicle drive unit of claim 9, wherein the upper sump is further configured to provide the lubricant to a second bearing.

11. The commercial electric vehicle drive unit of claim 1, wherein the differential comprises:
 a differential carrier, comprising a body and one or more openings cut into the body, the differential carrier defining a cavity, wherein the cavity houses one or more gears, clutches, and/or springs, and wherein the openings allow for the lubricant to pass into and out of the cavity;
 a plurality of carrier bolt holes, comprising a first bolt hole comprising a single bolt opening and a second carrier bolt hole comprising a first bolt opening configured to receive a fastener and a second bolt opening disposed within one of the openings cut into the body; and
 a drive gear coupled to the differential carrier via fasteners disposed within the plurality of carrier bolt holes.

12. The commercial electric vehicle drive unit of claim 11, wherein each carrier bolt hole is configured to receive a bolt to couple the drive gear to the differential carrier.

13. The commercial electric vehicle drive unit of claim 11, wherein the single bolt opening of the first bolt hole is a blind bolt hole.

14. The commercial electric vehicle drive unit of claim 1, wherein the transmission and/or the differential comprises:
 a bearing.

15. The commercial electric vehicle drive unit of claim 14, wherein the housing further comprises a housing rib disposed within an interior of the cavity and configured to receive the lubricant and guide the lubricant to the bearing.

16. The commercial electric vehicle drive unit of claim 15, wherein the housing rib is configured to guide the lubricant to a relief disposed around the bearing and configured to receive the lubricant from the housing rib.

* * * * *